(12) United States Patent
Han et al.

(10) Patent No.: US 12,489,113 B2
(45) Date of Patent: Dec. 2, 2025

(54) METHOD OF MANUFACTURING AN ALL SOLID STATE BATTERY

(71) Applicants: Hyundai Motor Company, Seoul (KR); Kia Corporation, Seoul (KR)

(72) Inventors: Sangwook Han, Ansan-si (KR); Hannah Song, Ansan-si (KR); Kyeong Wi Park, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 107 days.

(21) Appl. No.: 18/358,520

(22) Filed: Jul. 25, 2023

(65) Prior Publication Data
US 2023/0369587 A1    Nov. 16, 2023

Related U.S. Application Data

(62) Division of application No. 17/397,190, filed on Aug. 9, 2021, now Pat. No. 11,749,801.

(30) Foreign Application Priority Data

Dec. 21, 2020   (KR) .................. 10-2020-0179849

(51) Int. Cl.
| | |
|---|---|
| *H01M 4/58* | (2010.01) |
| *H01M 4/04* | (2006.01) |
| *H01M 4/66* | (2006.01) |
| *H01M 10/0562* | (2010.01) |
| *H01M 10/058* | (2010.01) |
| *H01M 4/02* | (2006.01) |

(52) U.S. Cl.
CPC ....... *H01M 4/5815* (2013.01); *H01M 4/0404* (2013.01); *H01M 4/661* (2013.01); *H01M 4/663* (2013.01); *H01M 4/666* (2013.01); *H01M 10/0562* (2013.01); *H01M 10/058* (2013.01); *H01M 2004/027* (2013.01); *H01M 2004/028* (2013.01); *H01M 2300/0068* (2013.01)

(58) Field of Classification Search
CPC ............ H01M 4/58; H01M 4/66; H01M 4/04; H01M 4/38; H01M 10/058; H01M 10/0525
See application file for complete search history.

(56) References Cited

U.S. PATENT DOCUMENTS

| | | | |
|---|---|---|---|
| 10,964,953 B2 | 3/2021 | Matsushita | |
| 2002/0004171 A1* | 1/2002 | Kimijima | H01M 10/0565 429/246 |

(Continued)

FOREIGN PATENT DOCUMENTS

| | | |
|---|---|---|
| JP | 2017073205 A | 4/2017 |
| JP | 2019135690 A | 8/2019 |

(Continued)

*Primary Examiner* — Kenneth J Douyette
(74) *Attorney, Agent, or Firm* — Slater Matsil, LLP

(57) ABSTRACT

A method of manufacturing an all solid state battery is disclosed. In one embodiment, the method includes forming a negative electrode including a negative active material layer and a negative buffer layer, forming a sulfide-based solid electrolyte layer on a first surface of the negative electrode, forming a positive electrode including a positive active material layer and a positive buffer layer, and bonding the positive electrode to a second surface of the solid electrolyte layer.

20 Claims, 11 Drawing Sheets

(56) References Cited

U.S. PATENT DOCUMENTS

| | | |
|---|---|---|
| 2018/0114986 A1* | 4/2018 | Baek .................... H01M 4/382 |
| 2019/0088949 A1 | 3/2019 | Makino et al. |
| 2020/0235424 A1 | 7/2020 | Mochizuki et al. |
| 2020/0321604 A1 | 10/2020 | Koenig, Jr. et al. |

FOREIGN PATENT DOCUMENTS

| | | |
|---|---|---|
| JP | 2020109747 A | 7/2020 |
| KR | 20190114903 A | 10/2019 |

\* cited by examiner

METHOD OF MANUFACTURING AN ALL SOLID STATE BATTERY

CROSS-REFERENCE TO RELATED APPLICATIONS

This application is a divisional of U.S. application Ser. No. 17/397,190, now U.S. Pat. No. 11,749,801, filed on Aug. 9, 2021, which claims the benefit of Korean Patent Application No. 10-2020-0179849, filed in the Korean Intellectual Property Office on Dec. 21, 2020, which applications are hereby incorporated herein by reference.

TECHNICAL FIELD

The present invention relates to an all solid state battery and a manufacturing method thereof.

BACKGROUND

In general, a lithium ion battery using a liquid electrolyte has a structure in which a negative electrode and a positive electrode are partitioned by a separator, and thus when the separator is damaged by deformation or external impact, a short circuit may occur, which may lead to a danger such as overheating or explosion.

Accordingly, development of a solid electrolyte capable of securing safety is a very important task in the field of secondary batteries.

The all solid state battery using the solid electrolyte is advantageous in that safety of the battery may be increased and leakage of an electrolyte solution may be prevented, so that reliability of the battery may be improved, and at the same time, it may be easy to manufacture a thin-type battery.

In addition, lithium metal can be used as the negative electrode, which can improve energy density, and accordingly, it is expected to be applied to high-capacity secondary batteries for electric vehicles as well as small secondary batteries, and is in the spotlight as a next-generation battery.

In the above-described all solid state battery in the prior art, a plurality of layers are stacked and then bonded through a rolling process.

For example, in the all solid state battery according to the prior art, a negative electrode and a positive electrode are symmetrically stacked with a solid electrolyte therebetween.

In this case, each of the negative electrode and the positive electrode includes a hard current collector and a soft active material layer.

Such an all solid state battery may reduce internal porosity by the rolling process, but when a material is springbacked or when charging or discharging is performed, there is a problem in that voids are re-formed due to a change in a volume of an active material.

In other words, an upper portion of each electrode may act as a buffer during charging and discharging due to the soft solid electrolyte layer to minimize a change in porosity, but since a lower portion of each electrode is formed by adhesion between the hard current collector and the material, the porosity may increase depending on a volume change at an interface of each material.

Accordingly, in the all solid state battery according to the prior art, ionic conductivity and electronic conductivity may decrease due to an increase in porosity, and in the long term, this may adversely affect performance of the battery.

The above information disclosed in this Background section is only for enhancement of understanding of the background of the invention, and therefore it may contain information that does not form the prior art that is already known to a person of ordinary skill in the art.

SUMMARY

The present invention relates to an all solid state battery and a manufacturing method thereof. Particular embodiments relate to an all solid state battery and a manufacturing method thereof capable of reducing porosity.

An embodiment of the present invention provides an all solid state battery and a manufacturing method thereof capable of minimizing electrode porosity that may occur after a rolling process by applying a negative electrode buffer layer and a positive electrode buffer layer and maximizing interlayer interfacial adhesion areas.

One or more embodiments of the present invention provide an all solid state battery including a sulfide-based solid electrolyte layer, a negative electrode configured to include a negative active material layer stacked on a first surface of the solid electrolyte layer, and a negative buffer layer stacked on a first surface of the negative active material layer, and a positive electrode configured to include a positive active material layer stacked on a second surface of the solid electrolyte layer, and a positive buffer layer stacked on a second surface of the positive active material layer.

In addition, the negative electrode may include a negative current collector layer configured to have surface roughness formed on a first surface thereof, a negative electrode primer layer disposed on a first surface of the negative current collector layer and formed of a mixture of a carbon-based conductive material and a binder, a negative electrode buffer layer disposed on a first surface of the negative primer layer and formed of a mixture of a sulfide-based material, a conductive material, and a binder, and a negative electrode active material layer disposed on a first surface of the negative buffer layer and made of a mixture of a sulfide-based material, a negative electrode active material, a conductive material, and a binder to be in contact with the solid electrolyte layer.

The negative current collector may include at least one of copper, stainless steel, titanium, iron, and nickel.

In addition, the negative primer layer may be formed by mixing a conductive material and a binder at a ratio of 7:3 to 9.5:0.5.

The negative buffer layer may be formed of a mixture of a sulfide-based material that is set in a range of 60 wt % or more and 90 wt % or less, a conductive material that is set in the range of 9 wt % or more and 30 wt % or less, and a binder that is set in a range of 1 wt % or more and 10 wt % or less, based on 100 wt % of a total weight.

The negative buffer layer may have softness that is higher than that of the negative primer layer.

The negative buffer layer may have the same ionic conductivity and electronic conductivity as those of the negative active material layer.

The negative active material layer may be formed of a mixture of a sulfide-based material in a range of 8 wt % to 30 wt %, a negative active material in a range of 60 wt % to 90 wt %, a conductive material in a range of 1 wt % to 10 wt %, and a binder in a range of 1 wt % to 10 wt %, based on 100 wt % of a total weight.

The positive electrode may include a positive current collector layer configured to have surface roughness formed on a first surface thereof, a positive electrode primer layer disposed on a first surface of the positive current collector layer and formed of a mixture of a carbon-based conductive material and a binder, a positive electrode buffer layer disposed on a first surface of the positive primer layer and formed of a mixture of a sulfide-based material, a conductive material, and a binder, and a positive electrode active material layer disposed on a first surface of the positive buffer layer and made of a mixture of a sulfide-based material, a positive electrode active material, a conductive material, and a binder, to be in contact with the solid electrolyte layer.

The positive current collector may include at least one of stainless steel, titanium, iron, nickel, aluminum, and chromium.

The positive primer layer may be formed by mixing a conductive material and a binder at a ratio of 7:3 to 9.5:0.5.

The positive buffer layer may be formed of a mixture of a sulfide-based material that is set in a range of 60 wt % or more and 90 wt % or less, a conductive material that is set in the range of 9 wt % or more and 30 wt % or less, and a binder that is set in a range of 1 wt % or more and 10 wt % or less, based on 100 wt % of a total weight.

The positive buffer layer may have softness that is higher than that of the positive primer layer.

The positive buffer layer may have the same ionic conductivity and electronic conductivity as those of the positive active material layer.

The positive active material layer may be formed of a mixture of a sulfide-based material in a range of 8 wt % to 30 wt %, a positive active material in a range of 60 wt % to 90 wt %, a conductive material in a range of 1 wt % to 10 wt %, and a binder in a range of 1 wt % to 10 wt %, based on 100 wt % of a total weight.

In accordance with the all solid state battery and a manufacturing method thereof according to the embodiments of the present invention, it is possible to minimize electrode porosity that may occur after a rolling process by applying a negative electrode buffer layer and a positive electrode buffer layer and maximizing interlayer interfacial adhesion areas.

In addition, in accordance with the all solid state battery and a manufacturing method thereof according to the embodiments of the present invention, it is possible to minimize deformation caused by volume change of the negative active material or positive active material that may occur during charging and discharging, resultantly improving a life characteristic.

Further, effects that can be obtained or expected from embodiments of the present invention are directly or suggestively described in the following detailed description. That is, various effects expected from embodiments of the present invention will be described in the following detailed description.

Figure 1:
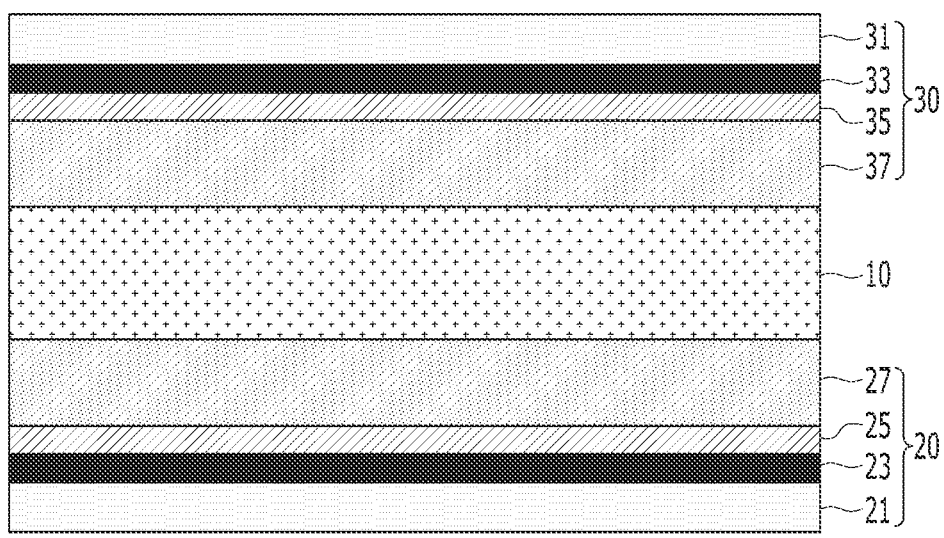
FIG. 1 illustrates a schematic view showing a cross-sectional structure of an all solid state battery according to an embodiment of the present invention.

The following elements may be used in connection with the drawings to describe embodiments of the present invention.
  1: all solid state battery
  10: solid electrolyte layer
  20: negative electrode
  21: negative current collector
  23: negative primer layer
  25: negative buffer layer
  27: negative active material layer
  30: positive electrode
  31: positive current collector
  33: positive primer layer
  35: positive buffer layer
  37: positive active material layer

DETAILED DESCRIPTION OF ILLUSTRATIVE EMBODIMENTS

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

Parts that are irrelevant to the description will be omitted to clearly describe the present disclosure, and like reference numerals designate like elements throughout the specification.

Figure 2:
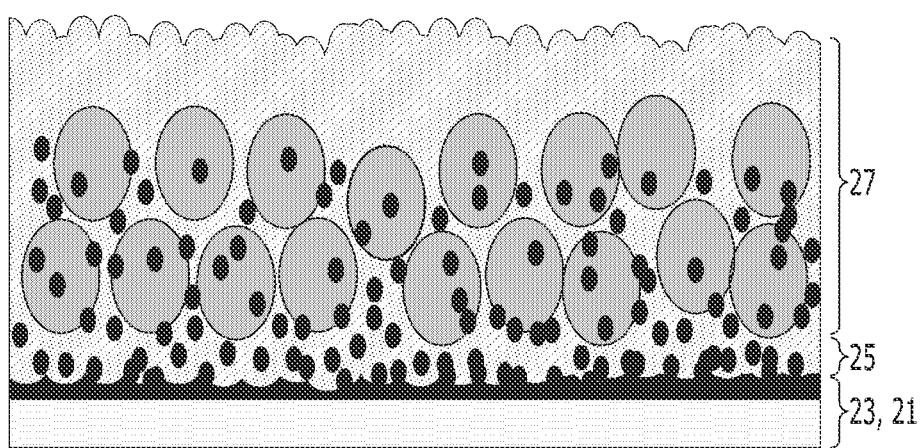
FIG. 2 schematically illustrates a cross-sectional structure of a negative electrode of an all solid state battery according to an embodiment of the present invention.
Figure 3:
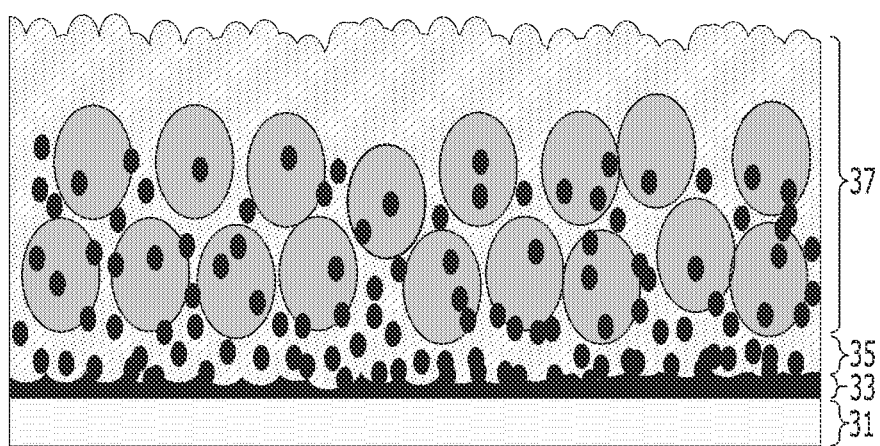
FIG. 3 schematically illustrates a cross-sectional structure of a positive electrode of an all solid state battery according to an embodiment of the present invention.

FIG. 1 illustrates a schematic view showing a cross-sectional structure of an all solid state battery according to an embodiment of the present invention, FIG. 2 schematically illustrates a cross-sectional structure of a negative electrode of an all solid state battery according to an embodiment of the present invention, and FIG. 3 schematically illustrates a cross-sectional structure of a positive electrode of an all solid state battery according to an embodiment of the present invention.

Referring to FIG. 1, the all solid state battery 1 according to the embodiment of the present invention includes a sulfide-based solid electrolyte layer 10, a negative electrode 20, and a positive electrode 30.

The negative electrode 20 is stacked on a first surface of the solid electrolyte layer 10, and the positive electrode 30 is stacked on a second surface thereof.

For example, based on the solid electrolyte layer 10, the negative electrode 20 may be stacked at a lower side, and the positive electrode 30 may be stacked at an upper side.

In an embodiment of the present invention, the left and right, front and rear, and up and down directions are set based on the drawing, and a portion facing an upper side is defined as an upper portion, an upper end, an upper surface, and an upper side portion, and a portion facing a lower side will be defined as a lower portion, a lower end, a lower surface, and a lower end portion.

The definition of the reference direction as described above is a relative meaning, and the direction may vary depending on the reference position of the all solid state battery 1 of embodiments of the present invention, and the reference direction described above is not necessarily limited to the reference direction of the present embodiment.

In an embodiment of the present invention, the solid electrolyte layer 10 may be formed of a sulfide-based material including a lithium sulfide-based compound or an argyrodite-based compound.

This has an advantage that the sulfide-based material applied to the solid electrolyte layer 10 has a superior soft characteristic compared to an oxide-based material, and is suitable for a structural characteristic of the all solid state battery 1 according to the embodiment of the present invention.

A material having ionic conductivity of $1*10^{-3}$ S/cm or more may be used for the solid electrolyte layer 10.

In addition, the solid electrolyte layer 10 may have a particle size (average diameter of each grain constituting the powder) in a range of 0.1 μm or more and 10 μm or less.

The solid electrolyte layer 10 may have a density that is set in a range of 0.1 g/cm³ or more and 1 g/cm³ or less.

The solid electrolyte layer 10 may be formed to have a thickness of 50 μm or more and 100 μm or less.

Referring to FIG. 2, in an embodiment of the present invention, the negative electrode 20 includes a negative current collector 21, a negative primer layer 23, a negative buffer layer 25, and a negative active material layer 27.

The negative current collector 21 may include at least one of copper, stainless steel, titanium, iron, and nickel.

The negative current collector 21 has surface roughness formed on an upper surface thereof.

The surface roughness refers to a degree of fine irregularities generated on the surface.

Such surface roughness may be formed through plasma surface treatment or corona surface treatment.

The negative current collector 21 may have a thickness of 15 μm or more and 20 μm or less.

In addition, the negative primer layer 23 is formed on an upper surface of the negative current collector 21.

The negative primer layer 23 may be formed of a mixture of a carbon-based conductive material and a binder.

For example, the negative primer layer 23 can be formed by mixing a conductive material and a binder at a ratio of 7:3 to 9.5:0.5.

The negative primer layer 23 may be formed to have a thickness of 1 μm or less.

The negative buffer layer 25 is formed on an upper surface of the negative primer layer 23.

The negative buffer layer 25 may be formed by mixing a sulfide-based material, a conductive material, and a binder.

For example, the negative buffer layer 25 may be formed of a mixture of a sulfide-based material that is set in a range of 60 wt % or more and 90 wt % or less, a conductive material that is set in the range of 9 wt % or more and 30 wt % or less, and a binder that is set in a range of 1 wt % or more and 10 wt % or less, based on 100 wt % of a total weight.

The negative buffer layer 25 may have the same ionic conductivity and electronic conductivity as those of the negative active material layer 27.

For example, the negative buffer layer 25 may have ionic conductivity that is set in a range of 1 mS/cm or more and $9.99*10^{-9}$ S/cm or less.

In addition, the negative buffer layer 25 has softness that is higher than that of the negative primer layer 23.

The negative buffer layer 25 may be formed to have a thickness of 20 μm or more and 100 μm or less.

The negative active material layer 27 is formed on an upper surface of the negative buffer layer 25.

The negative active material layer 27 may be formed of a mixture of a sulfide-based material, a negative active material, a conductive material, and a binder.

For example, the negative active material layer 27 may be formed of a mixture of a sulfide-based material in a range of 8 wt % to 30 wt %, a negative active material in a range of 60 wt % to 90 wt %, a conductive material in a range of 1 wt % to 10 wt %, and a binder in a range of 1 wt % to 10 wt %, based on 100 wt % of a total weight.

The negative active material layer 27 may be formed to have a thickness of 20 μm or more and 100 μm or less.

The solid electrolyte layer 10 is disposed on an upper surface of the negative active material layer 27.

In addition, the positive electrode 30 is formed on an upper surface of the solid electrolyte layer 10, and is formed to be symmetrical with the negative electrode 20 with respect to the solid electrolyte layer 10.

Referring to FIG. 3, the positive electrode 30 is formed in the same manner as the negative electrode 20, and then is inverted in a vertical direction to be stacked on an upper surface of the solid electrolyte layer 10, but a structure will be described based on a direction shown in FIG. 1.

Accordingly, the positive electrode 30 will be described starting with the positive current collector 31 positioned at an outermost upper portion thereof.

In the present embodiment, the positive electrode 30 includes the positive current collector 31, a positive primer layer 33, a positive buffer layer 35, and a positive active material layer 37.

The positive current collector 31 may include at least one of stainless steel, titanium, iron, nickel, aluminum, and chromium.

The positive current collector 31 has surface roughness formed on a lower surface thereof.

The surface roughness on the positive current collector 31 is the same as the surface roughness on the negative current collector 21.

The positive current collector 31 may have a thickness of 15 μm or more and 20 μm or less.

In addition, the positive primer layer 33 is formed on a lower surface of the positive current collector 31.

The positive primer layer 33 may be formed of a mixture of a carbon-based conductive material and a binder.

For example, the positive primer layer 33 can be formed by mixing a conductive material and a binder at a ratio of 7:3 to 9.5:0.5.

The positive primer layer 33 may be formed to have a thickness of 1 μm or less.

The positive buffer layer 35 is formed on a lower surface of the positive primer layer 33.

The positive buffer layer 35 may be formed by mixing a sulfide-based material, a conductive material, and a binder.

For example, the positive buffer layer 35 may be formed of a mixture of a sulfide-based material that is set in a range of 60 wt % or more and 90 wt % or less, a conductive material that is set in the range of 9 wt % or more and 30 wt % or less, and a binder that is set in a range of 1 wt % or more and 10 wt % or less, based on 100 wt % of a total weight.

The positive buffer layer 35 may have the same ionic conductivity and electronic conductivity as those of the positive active material layer 37.

For example, the positive buffer layer 35 may have ionic conductivity that is set in a range of 1 mS/cm or more and $9.99*10^{-9}$ S/cm or less.

In addition, the positive buffer layer 35 has softness that is higher than that of the positive primer layer 33.

The positive buffer layer 35 may be formed to have a thickness of 1 μm or more and 5 μm or less.

The positive active material layer 37 is formed on a lower surface of the positive buffer layer 35.

The positive active material layer 37 may be formed of a mixture of a sulfide-based material, a positive active material, a conductive material, and a binder.

For example, the positive active material layer 37 may be formed of a mixture of a sulfide-based material in a range of 8 wt % to 30 wt %, a positive active material in a range of 60 wt % to 90 wt %, a conductive material in a range of 1 wt % to 10 wt %, and a binder in a range of 1 wt % to 10 wt %, based on 100 wt % of a total weight.

The positive active material layer 37 may be formed to have a thickness of 20 μm or more and 100 μm or less.

The solid electrolyte layer 10 is disposed on a lower surface of the positive active material layer 37.

A manufacturing method of the all solid state battery configured as described above will be as follows.

FIG. 4 to FIG. 11 illustrate views sequentially showing a manufacturing method of an all solid state battery according to an embodiment of the present invention.

In accordance with the manufacturing method of the all solid state battery, the negative electrode 20 and the positive electrode 30 are separately manufactured, and then the negative electrode 20 and the positive electrode 30 are bonded to a first side and a second side of the solid electrolyte layer 10, respectively.

In this case, the negative electrode 20 is disposed on a lower surface of the solid electrolyte layer 10, and the positive electrode 30 is disposed on an upper surface of the solid electrolyte layer 10.

Accordingly, the positive electrode 30 may be formed to be symmetrical with the negative electrode 20 with respect to the solid electrolyte layer 10 by stacking each material in order, and then by inverting it in a vertical direction and bonding it to the upper surface of the solid electrolyte layer 10.

Figure 4:
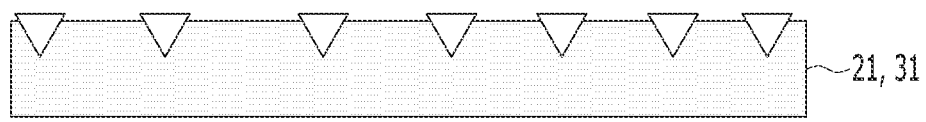
FIG. 4 to FIG. 11 illustrate views sequentially showing a manufacturing method of an all solid state battery according to an embodiment of the present invention.

Referring to FIG. 4, surface roughness is formed on an upper surface of the negative current collector 21 through a surface treatment.

The surface treatment may include a plasma surface treatment or a corona surface treatment.

The plasma surface treatment or corona surface treatment is a process of roughening a surface by irradiating plasma or corona on the upper surface of the negative current collector 21 to change a state of the surface.

This surface treatment is to increase a bonding area depending on the surface roughness.

Figure 5:
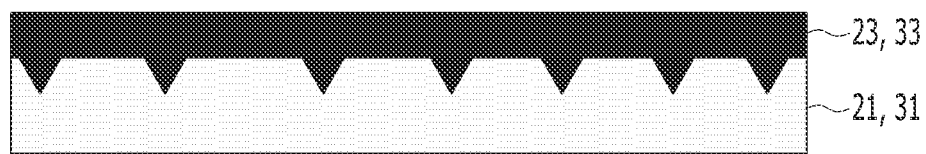

Referring to FIG. 5, the negative primer layer 23 is formed on the upper surface of the negative current collector 21.

The negative primer layer 23 is formed through wet coating, and the wet coating may include gravure coating and slot die coating, for example.

The negative primer layer 23 may prevent corrosion of the negative current collector 21.

In addition, the negative primer layer 23 is made of a mixture of a carbon-based conductive material and a binder, and electronic conductivity may be improved by the carbon-based conductive material.

Figure 6:
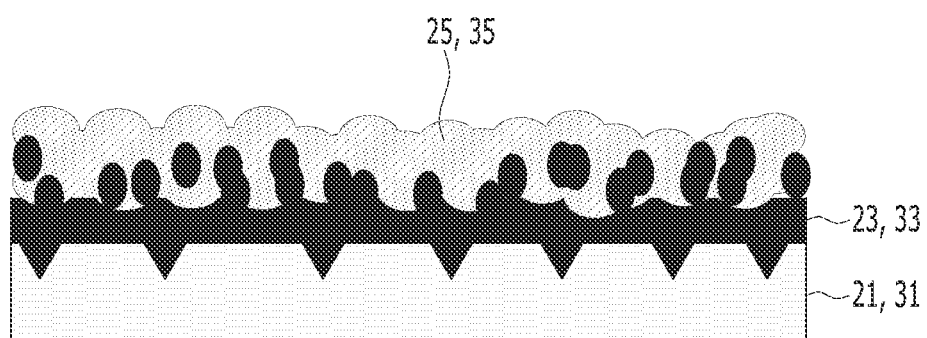

Referring to FIG. 6, the negative buffer layer 25 is formed on an upper surface of the negative primer layer 23.

The negative buffer layer 25 is formed through wet coating, and the wet coating may include gravure coating and slot die coating, for example.

The negative buffer layer 25 has softness that is higher than that of the negative primer layer 23.

The negative buffer layer 25 may move ions and electrons, thereby improving capacitance.

Figure 7:
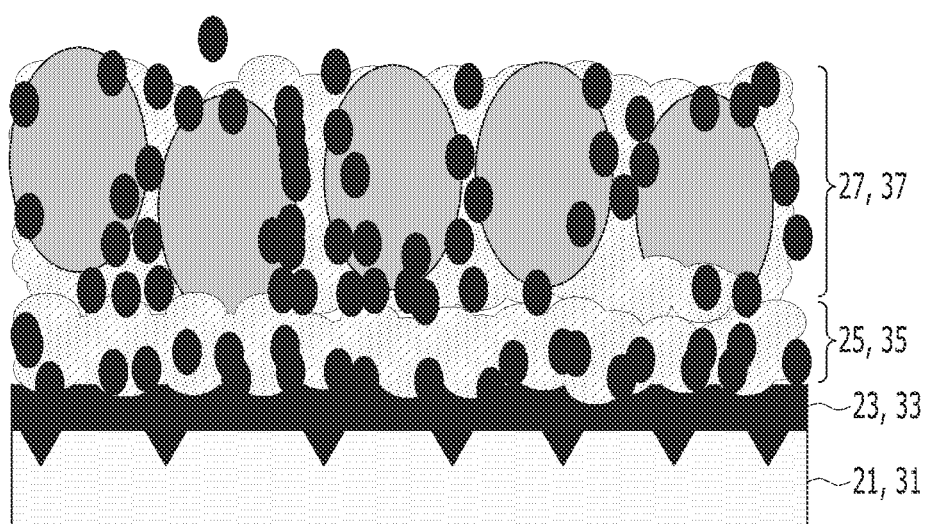

Referring to FIG. 7, the negative active material layer 27 is formed on an upper surface of the negative buffer layer 25.

The negative active material layer 27 may have the same ionic conductivity and electronic conductivity as those of the negative buffer layer 25.

Figure 8:
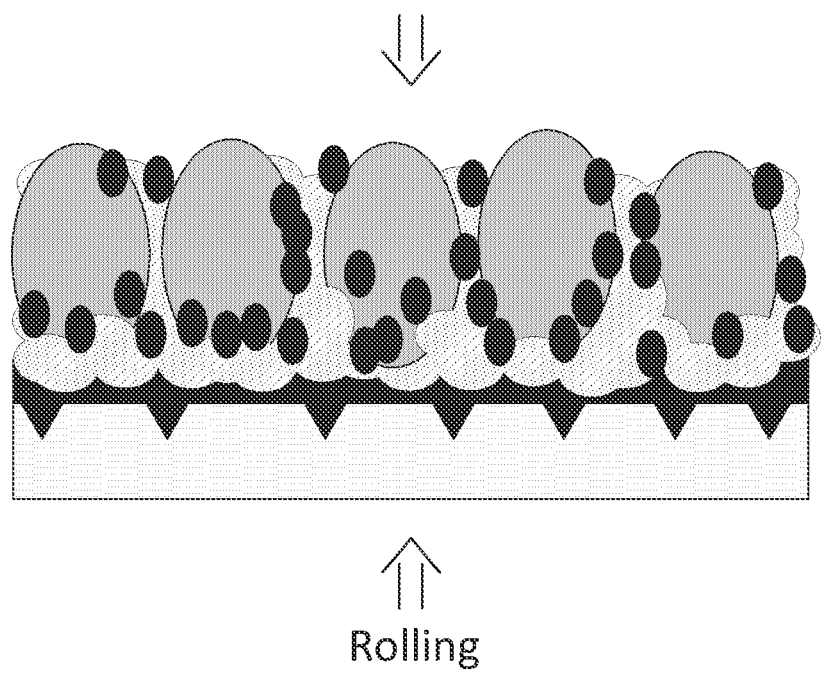

Referring to FIG. 8, when the negative current collector 21, the negative primer layer 23, the negative buffer layer 25, and the negative active material layer 27 are stacked as described above, a rolling process is performed.

In this case, the rolling process is performed at a pressure that is set in a range of 0.1 MPa or more and 10 MPa or less.

The negative electrode 20 increases physical cohesion between the negative buffer layer 25 and the negative active material layer 27 during the rolling process due to high softness of the negative buffer layer 25.

Figure 9:
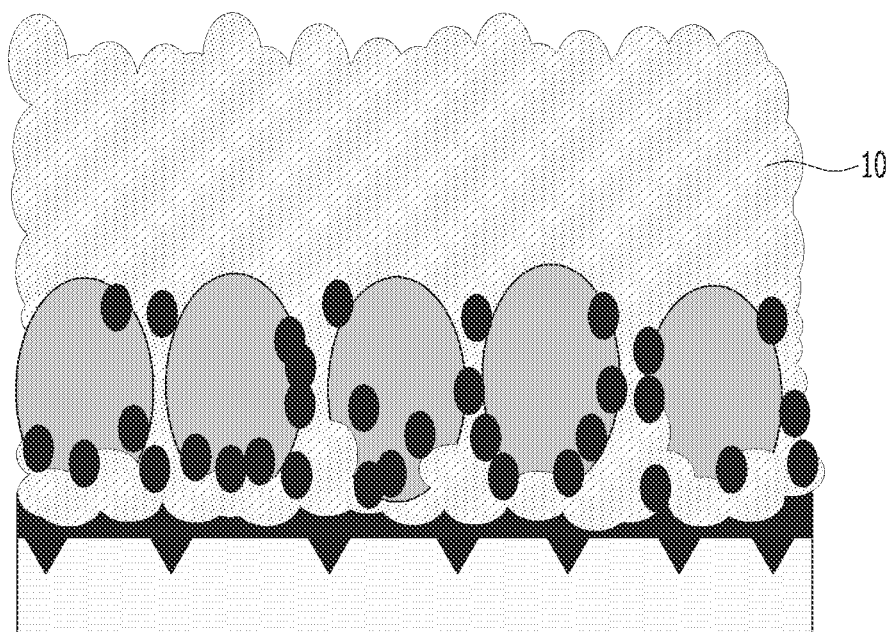

Referring to FIG. 9, the solid electrolyte layer 10 is formed on an upper surface of the negative active material.

The solid electrolyte layer 10 is formed through wet coating, and the wet coating may include gravure coating and slot die coating, for example.

Ions may move through the solid electrolyte layer 10.

Next, steps of FIG. 4 to FIG. 8 are repeated to form the positive electrode 30.

That is, surface roughness is formed on an upper surface of the positive current collector 31 through a surface treatment, the positive primer layer 33 is formed on the upper surface of the positive current collector 31, the positive buffer layer 35 is formed on an upper surface of the positive primer layer 33, and the positive active material layer 37 is formed on an upper surface of the positive buffer layer 35.

Figure 10:
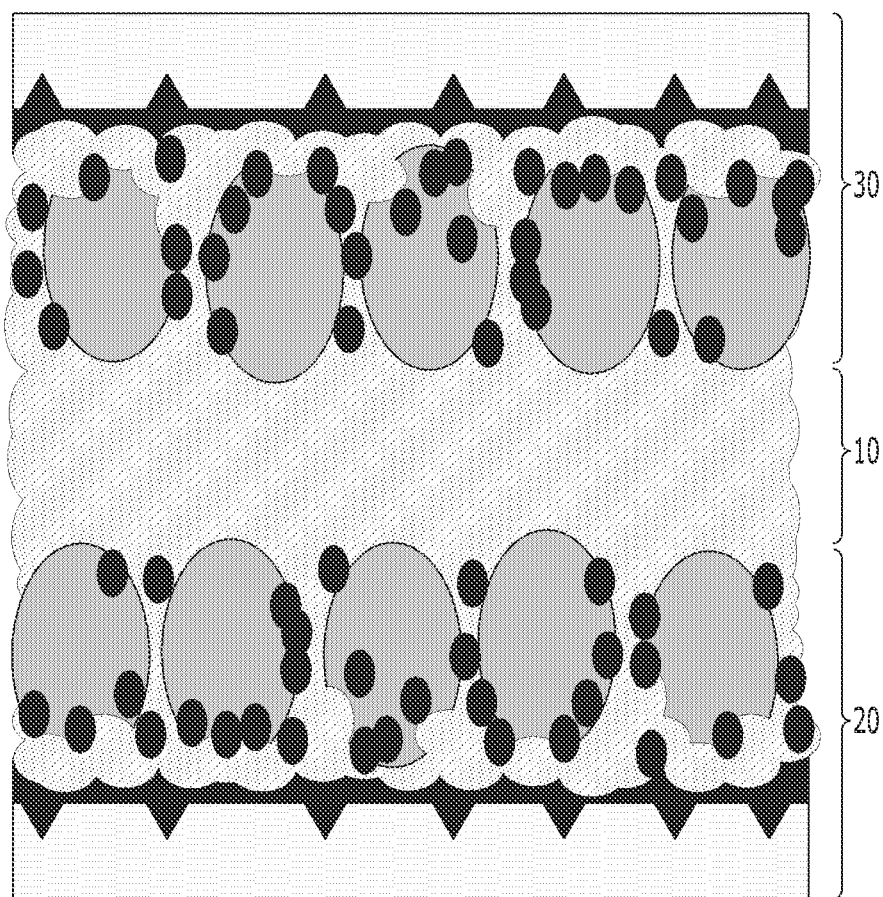

Referring to FIG. 10, the positive electrode 30 formed as described above is inverted in the vertical direction, and then is stacked on the upper surface of the solid electrolyte layer 10.

In other words, the positive active material layer 37 of the positive electrode 30 is disposed to contact the solid electrolyte layer 10, and is stacked.

Figure 11:
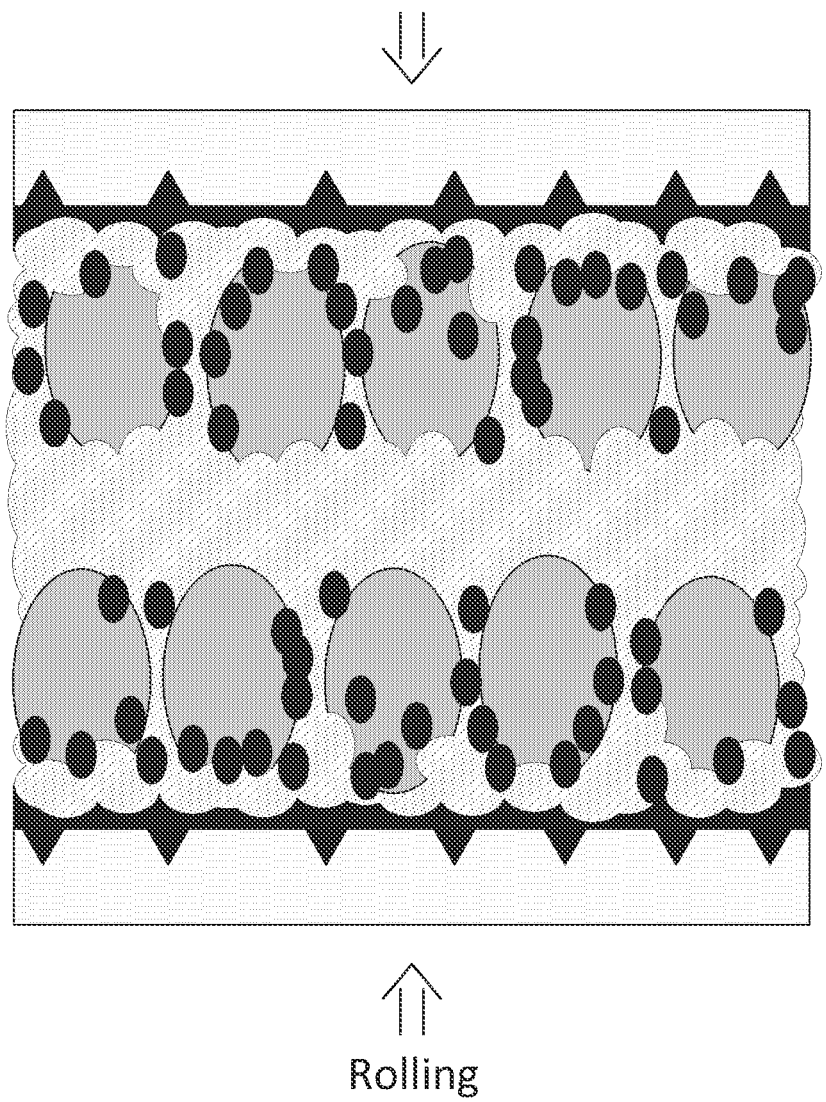

Referring to FIG. 11, a rolling process is performed on the negative electrode 20, the solid electrolyte layer 10, and the positive electrode 30 which are stacked.

In this case, the rolling process is performed at a pressure that is set in a range of 0.1 MPa or more and 10 MPa or less.

The all solid state battery 1 may improve binding strength between the negative active material, the solid electrolyte layer 10, and the positive active material through the rolling process.

Accordingly, in accordance with the all solid state battery and a manufacturing method thereof according to the embodiments of the present invention, it is possible to minimize electrode porosity that may occur after a rolling process by applying a negative electrode buffer layer and a positive electrode buffer layer, and maximizing interlayer interfacial adhesion areas.

Thus, in accordance with the all solid state battery and a manufacturing method thereof, ions and electrons may move uniformly at upper and lower portions of an electrode, thereby improving the output and durability.

In addition, in accordance with the all solid state battery and a manufacturing method thereof according to the embodiments of the present invention, it is possible to minimize deformation caused by volume change of the negative active material or positive active material that may occur during charging and discharging, resultantly improving a life characteristic.

While the present invention has been particularly shown and described with reference to specific embodiments thereof, it will be understood by those skilled in the art that various changes in form and detail may be made therein without departing from the spirit and scope of the invention as defined by the following claims.

What is claimed is:

1. A method for manufacturing a solid state battery, the method comprising:
   forming a negative electrode including a negative active material layer and a negative buffer layer;
   forming a sulfide-based solid electrolyte layer on a first surface of the negative electrode;
   forming a positive electrode including a positive active material layer and a positive buffer layer; and
   bonding the positive electrode to a second surface of the solid electrolyte layer
   wherein forming the negative electrode comprises:
      forming surface roughness on a first surface of a negative current collector through a surface treatment,
      forming a negative primer layer on the first surface of the negative current collector through wet coating,
      forming the negative buffer layer having higher softness than that of the negative primer layer on a first surface of the negative primer layer through wet coating,
      forming the negative active material layer having the same ionic conductivity and electronic conductivity as the negative buffer layer on a first surface of the negative buffer layer, and
      rolling the negative current collector, the negative primer layer, the negative buffer layer, and the negative active material layer, which are stacked.

2. The method of claim 1, wherein the sulfide-based solid electrolyte layer is formed on a first surface of the negative active material layer through wet coating.

3. The method of claim 1, wherein the negative primer layer comprises a mixture of a carbon-based conductive material and a first binder.

4. The method of claim 1, wherein the negative buffer layer comprises a mixture of a first sulfide-based material, a first conductive material, and a second binder, wherein the negative buffer layer has a different composition than the negative active material layer.

5. The method of claim 1, wherein the negative buffer layer has a degree of softness that is higher than that of the negative primer layer.

6. The method of claim 1, wherein the negative active material layer comprises a mixture of a second sulfide-based material, a negative electrode active material, a second conductive material, and a third binder, and wherein the negative active material layer is in contact with the solid electrolyte layer.

7. The method of claim 1, wherein forming the positive electrode comprises:
   forming surface roughness on a first surface of a positive current collector through a surface treatment,
   forming a positive primer layer comprising a mixture of a carbon-based material and a first binder on the first surface of the positive current collector through wet coating,
   forming the positive buffer layer having higher softness than the positive primer layer on a first surface of the positive primer layer,
   forming the positive active material layer having the same ionic conductivity and electronic conductivity as the positive buffer layer on a first surface of the positive buffer layer, and
   rolling the positive current collector, the positive primer layer, the positive buffer layer, and the positive active material layer which are stacked.

8. A method for manufacturing a solid state battery, the method comprising:
   forming a negative electrode including a negative active material layer and a negative buffer layer;
   forming a sulfide-based solid electrolyte layer on a first surface of the negative electrode;
   forming a positive electrode including a positive active material layer and a positive buffer layer; and
   bonding the positive electrode to a second surface of the solid electrolyte layer,
   wherein forming the positive electrode comprises:
      forming surface roughness on a first surface of a positive current collector through a surface treatment,
      forming a positive primer layer comprising a mixture of a carbon-based material and a first binder on the first surface of the positive current collector through wet coating,
      forming the positive buffer layer having higher softness than the positive primer layer on a first surface of the positive primer layer,
      forming the positive active material layer the same ionic conductivity and electronic conductivity as the positive buffer layer on a first surface of the positive buffer layer, and
      rolling the positive current collector, the positive primer layer, the positive buffer layer, and the positive active material layer, which are stacked.

9. The method of claim 8, wherein the positive buffer layer has a degree of softness that is higher than that of the positive primer layer.

10. The method of claim 1, wherein bonding the positive electrode includes:
   inverting the positive electrode in a vertical direction and contacting the sulfide-based solid electrolyte layer with the positive active material layer of the positive electrode, and
   rolling the negative electrode, the sulfide-based solid electrolyte layer, and the positive electrode.

11. A method for forming a solid state battery, the method comprising:
   forming a negative active material layer on a first surface of a solid electrolyte layer;
   forming a negative buffer layer on a first surface of the negative active material layer, the negative buffer layer comprising a mixture of a first sulfide-based material, a first conductive material, and a second binder, wherein the negative buffer layer has a different composition than the negative active material layer;
   forming a negative primer layer on a first surface of the negative buffer layer, wherein the negative buffer layer has a degree of softness that is higher than that of the negative primer layer;
   forming a negative current collector layer having a second surface disposed on a first surface of the negative primer layer, the second surface of the negative current collector layer having a surface roughness;
   forming a positive active material layer on a second surface of the solid electrolyte layer;
   forming a positive buffer layer on a second surface of the positive active material layer, the positive buffer layer comprising a mixture of the first sulfide-based material, the first conductive material, and the second binder without an active material, wherein the positive buffer layer has a different composition than the positive active material layer;

forming a positive primer layer on a second surface of the positive buffer layer, wherein the positive buffer layer has a degree of softness that is higher than that of the positive primer layer; and forming a positive current collector layer having a first surface disposed on a second surface of the positive primer layer, the first surface of the positive current collector layer having a surface roughness.

12. The method of claim 11, wherein the negative primer layer comprises a mixture of a carbon-based conductive material and a first binder, and wherein the negative active material layer comprises a mixture of a second sulfide-based material, a negative electrode active material, a second conductive material, and a third binder, wherein the negative active material layer is in contact with the solid electrolyte layer.

13. The method of claim 12, wherein the mixture of the carbon-based conductive material and the first binder of the negative primer layer has a ratio of 7:3 to 9.5:0.5.

14. The method of claim 11, wherein the mixture of the negative buffer layer comprises the first sulfide-based material in a range of 60 wt % or more and 90 wt % or less, the first conductive material in a range of 9 wt % or more and 30 wt % or less, and the second binder in a range of 1 wt % or more and 10 wt % or less, based on 100 wt % of a total weight.

15. The method of claim 11, wherein the negative buffer layer has the same ionic conductivity and electronic conductivity as the negative active material layer.

16. The method of claim 11, wherein the positive primer layer comprises a mixture of a carbon-based conductive material and a first binder, and wherein the positive active material layer comprises a mixture of a second sulfide-based material, a positive electrode active material, a second conductive material, and a third binder, wherein the positive active material layer is in contact with the solid electrolyte layer.

17. The method of claim 16, wherein the mixture of the carbon-based conductive material and the first binder of the positive primer layer has a ratio of 7:3 to 9.5:0.5.

18. The method of claim 11, wherein the mixture of the positive buffer layer comprises the first sulfide-based material in a range of 60 wt % or more and 90 wt % or less, the first conductive material in a range of 9 wt % or more and 30 wt % or less, and the second binder in a range of 1 wt % or more and 10 wt % or less, based on 100 wt % of a total weight.

19. The method of claim 11, wherein the positive buffer layer has the same ionic conductivity and electronic conductivity as the positive active material layer.

20. The method of claim 8, wherein the positive buffer layer comprises a mixture of a first sulfide-based material, a first conductive material, and a second binder without an active material, wherein the positive buffer layer has a different composition than the positive active material layer.

* * * * *